(12) United States Patent
Kim et al.

(10) Patent No.: US 9,076,232 B2
(45) Date of Patent: Jul. 7, 2015

(54) APPARATUS AND METHOD FOR INTERPOLATING IMAGE, AND APPARATUS FOR PROCESSING IMAGE USING THE SAME

(71) Applicant: Industry-Academic Cooperation Foundation, Yonsei University, Seoul (KR)

(72) Inventors: Jaeseok Kim, Seoul (KR); Yujin Yun, Seoul (KR); Jonghyun Bae, Gyeonggi-do (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days.

(21) Appl. No.: 13/681,810

(22) Filed: Nov. 20, 2012

(65) Prior Publication Data
US 2014/0016870 A1   Jan. 16, 2014

Related U.S. Application Data

(60) Provisional application No. 61/578,610, filed on Dec. 21, 2011.

(30) Foreign Application Priority Data

Nov. 29, 2011  (KR) .......................... 10-2011-0125577
Oct. 29, 2012  (KR) .......................... 10-2012-0120367

(51) Int. Cl.
*G06T 3/40*  (2006.01)

(52) U.S. Cl.
CPC ........................................ *G06T 3/403* (2013.01)

(58) Field of Classification Search
CPC .............................. G06T 3/4007; G06T 3/403
USPC .................................. 382/199, 266, 299, 300
See application file for complete search history.

(56) References Cited

U.S. PATENT DOCUMENTS

| | | | | |
|---|---|---|---|---|
| 7,187,811 B2* | 3/2007 | Lin et al. | ........................ | 382/299 |
| 8,045,826 B2* | 10/2011 | Lukac | ............................ | 382/293 |
| 8,320,700 B2* | 11/2012 | Lee | ............................... | 382/268 |
| 8,331,710 B2* | 12/2012 | Kawase et al. | ................. | 382/254 |
| 2002/0093511 A1* | 7/2002 | Murphy | ........................ | 345/606 |
| 2005/0036711 A1* | 2/2005 | Abe | ............................... | 382/300 |
| 2010/0053351 A1* | 3/2010 | Lukac | ........................ | 348/222.1 |
| 2013/0100314 A1* | 4/2013 | Li et al. | ...................... | 348/229.1 |
| 2014/0016870 A1* | 1/2014 | Kim et al. | ...................... | 382/199 |

FOREIGN PATENT DOCUMENTS

| | | |
|---|---|---|
| KR | 1020070119482 A | 12/2007 |
| KR | 1020080072450 A | 8/2008 |
| KR | 10-2013-0059546 A | 6/2013 |

* cited by examiner

*Primary Examiner* — Gregory M Desire
(74) *Attorney, Agent, or Firm* — Harness, Dickey & Pierce, P.L.C.

(57) ABSTRACT

An image interpolation apparatus is provided which includes an edge area distinguishing part configured to distinguish an edge area including an edge from an image; an edge area classifying part configured to classify the edge area into a plurality of regions; and an interpolation part configured to perform interpolation the regions in different manners.

21 Claims, 16 Drawing Sheets

100

APPARATUS AND METHOD FOR INTERPOLATING IMAGE, AND APPARATUS FOR PROCESSING IMAGE USING THE SAME

CROSS-REFERENCE TO RELATED APPLICATIONS

This application claims priority from provisional application 61/578,610, filed Dec. 21, 2011. Also, a claim for priority under 35 U.S.C. §119 is made to Korean Patent Application No. 10-2011-0125577 filed Nov. 29, 2011, and Korean Patent Application No. 10-2012-0120367 filed Oct. 29, 2012 in the Korean Intellectual Property Office, the entire contents of which are hereby incorporated by reference.

BACKGROUND

The inventive concepts described herein relate to an image interpolation apparatus, an image interpolation method, and an image processing apparatus using the same.

In image processing, enlargement of an original image may mean that a coordinate of each pixel of the original image is moved by an enlargement magnification. However, at image enlargement, pixels to which pixel values are not assigned may exist, and may be called "holes". A processing method in which an appropriate data value is assigned to an empty pixel may be referred to as interpolation.

Interpolation may be performed by regression analysis of a linear function or a multi-function generated using pixels having known values, Fourier series, Spline, Moving average, Kriging, and so on. The interpolation may include Nearest Neighbor Interpolation, Bilinear Interpolation, Cubic Interpolation, Higher Order Interpolation, B-Spline Interpolation, and so on.

However, the quality of an image interpolated using the above-described manner may be deteriorated in comparison with an original image. When an enlargement magnification of an image increases, it may be difficult to distinguish a detail of the image. In particular, blocking may arise at a portion corresponding to an edge of an image. Thus, it may be difficult to obtain a high-quality image using a conventional interpolation manner.

SUMMARY

The inventive concept provides an image interpolation apparatus which comprises an edge area distinguishing part configured to distinguish an edge area including an edge from an image; an edge area classifying part configured to classify the edge area into a plurality of regions; and an interpolation part configured to interpolate each of the plurality of regions in different manners.

In example embodiments, the edge area distinguishing part distinguishes the edge area by calculating variance of pixel values of pixels included in a region of the image.

In example embodiments, the edge area distinguishing part decides the region as an edge area when the variance of the pixel values is larger than a predetermined threshold value and as a non-edge area when the variance of the pixel values is equal to or smaller than the predetermined threshold value.

In example embodiments, the image interpolation apparatus further comprises an edge map generating part configured to generate an edge map by detecting an edge included in the edge area.

In example embodiments, the edge map generating part detects a first pixel corresponding to an edge at the edge area, detects a second pixel, corresponding to an edge, among a plurality of pixels located around the first pixel, and connects the first and second pixels.

In example embodiments, the edge area classifying part classifies the edge area according to the number of edges included in the region of the edge map.

In example embodiments, the edge area classifying part decides the region as a first region when the number of edges included in the region is equal to or less than a predetermined threshold value and as a second region when the number of edges included in the region is more than the predetermined threshold value.

In example embodiments, the interpolation part interpolates a pixel included in the first region by using neighboring pixels more than 4, which are located around the pixel.

In example embodiments, the interpolation part interpolates a pixel included in the first pixel using 12 neighboring pixels surrounding the pixel.

In example embodiments, the interpolation part calculates a pixel value of the pixel by applying weights to pixel values of neighboring pixels and adding the weighted pixel values.

In example embodiments, the weights are calculated using a Wiener filter.

In example embodiments, the weights are calculated based on distance between the pixel and the neighboring pixels.

In example embodiments, the interpolation part interpolates a pixel included in the second region by using neighboring pixels equal to or less than 4, which are located around the pixel.

In example embodiments, the interpolation part interpolates a pixel of a non-edge area not including an edge at the image by using linear interpolation manner.

The inventive concept also provides an image interpolation method performing interpolation with respect to an edge area including an edge at an image in a plurality of manners by using an image interpolation apparatus.

In example embodiments, the image interpolation method comprises distinguishing an edge area from the image; classifying the edge area into a plurality of regions; and interpolating each of the plurality of regions in different manners.

In example embodiments, the distinguishing an edge area from the image comprises reading a region having a predetermined size from the image; calculating variance of pixel values of pixels included in the read region; and deciding the read region as an edge area when the variance of the pixel values is larger than a predetermined threshold value.

In example embodiments, the classifying the edge area into a plurality of regions comprises generating an edge map by detecting an edge included in the edge area; reading a region having a predetermined size from the edge map; calculating the number of edges included in the read region; deciding the read region as a first region when the number of edges is equal to or less than a predetermined threshold value; and deciding the read region as a second region when the number of edges is more than the predetermined threshold value.

In example embodiments, the interpolating each of the plurality of regions in different manners comprises interpolating a pixel included in the first region using neighboring pixels more than 4, which are located around the pixel.

In example embodiments, the interpolating each of the plurality of regions in different manners comprises interpolating a pixel included in the second region using neighboring pixels equal to or less than 4, which are located around the pixel.

In example embodiments, the interpolating each of the plurality of regions in different manners comprises interpolating a pixel of a non-edge area not including an edge at the image in linear interpolation manner.

The inventive concept also provides an image processing apparatus, which comprises a receiving part configured to receive an image; a processing part configured to process the received image; a storage part configured to store an image or data to be used to process the image; and an output part configured to output the processed image. The processing part comprises an edge area distinguishing part configured to distinguish an edge area including an edge from the received image; an edge map generating part configured to generate an edge map by detecting an edge included in the edge area; an edge area classifying part configured to classify the edge area into a plurality of regions using the edge map; and an interpolation part configured to interpolate each of the plurality of regions in different manners.

In example embodiments, the edge area classifying part decides a region of the edge area as a first region when the number of edges included in the region is equal to or less than a predetermined threshold value and as a second region when the number of edges included in the region is more than the predetermined threshold value.

In example embodiments, the interpolation part interpolates a pixel included in the first region using neighboring pixels more than 4, which are located around the pixel, interpolates a pixel included in the second region using neighboring pixels equal to or less than 4, which are located around the pixel, and interpolates a pixel of a non-edge area not including an edge at the image using linear interpolation manner.

An image interpolation method of the inventive concept may be implemented to a program executed by a computer.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
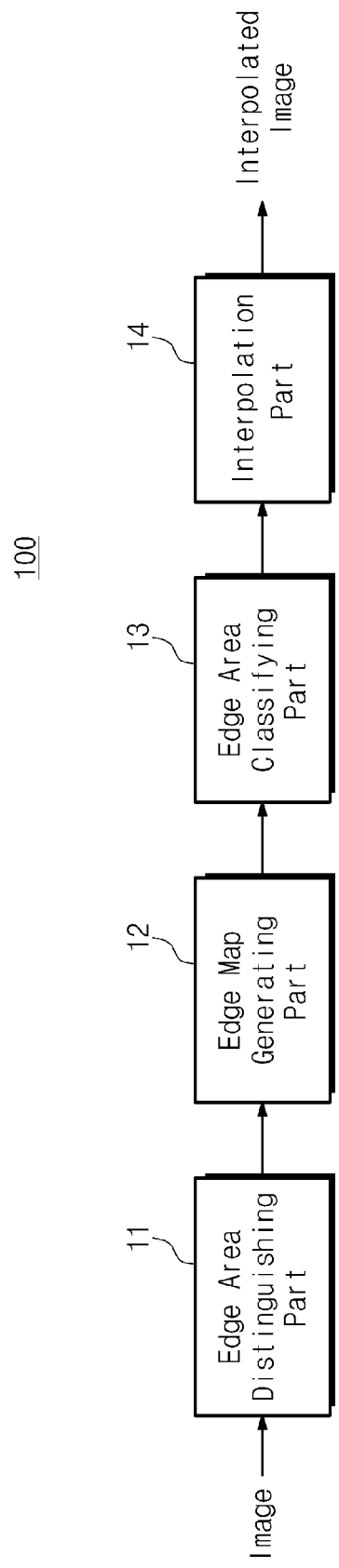
FIG. 1 is a block diagram schematically illustrating an image interpolation apparatus according to an embodiment of the inventive concept.

The present disclosure incorporates the disclosures of the publications: Yun, et al., "Adaptive Multidirectional Edge Directed Interpolation For Selected Edge Regions", TENCON 2011-2011 IEEE Region 10 Conference, pages 385-388 (Nov. 21-24), 2011; and Yun, et al., "Multidirectional Edge-Directed Interpolation With Region Division For Natural Images", Opt. Eng. 51(4), 040503 (Apr. 11, 2012), the entire contents of which are hereby incorporated in their entirety.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The terms "part", "block", "module", and so on may be used to indicate such a unit that at least function or operation is processed. For example, the terms may be used to indicate a hardware component such as software, FPGA, or ASIC. However, the terms may not be limited to software or hardware. Components corresponding to the terms may be provided at a storage medium capable of being addressed, and may be configured to replay one or more processors.

Thus, as an example, "part", "block", and "module" may include components such as software components, object-oriented software components, class components, and task components, processes, functions, attributes, procedures, sub-routines, segments of a program code, drivers, firmware, microcode, circuit, data, database, data structures, tables, arrays, and variables. Components and functions provided by "part", "block", and "module" may be formed of a less number of components and "part", "block", and "module", or may be further divided into additional components and "part", "block", and "module".

Below, an embodiment of the inventive concept will be more fully described with reference to accompanying drawings.

An image interpolation apparatus according to an embodiment of the inventive concept may perform interpolation by a plurality of manners with respect to an edge area including an edge at an image. In other words, the image interpolation apparatus according to an embodiment of the inventive concept may divide an edge area of an image into a plurality of regions, and may selectively apply an interpolation manner to each region.

FIG. 1 is a block diagram schematically illustrating an image interpolation apparatus according to an embodiment of the inventive concept. As illustrated in FIG. 1, an image interpolation apparatus 100 according to an embodiment of the inventive concept may include an edge area distinguishing part 11, an edge area classifying part 13, and an interpolation part 14. The edge area distinguishing part 11 may distinguish an edge from an image. The edge area classifying part 13 may classify the edge area into a plurality of regions. The interpolation part 14 may interpolate the regions in different manners.

Figure 2:
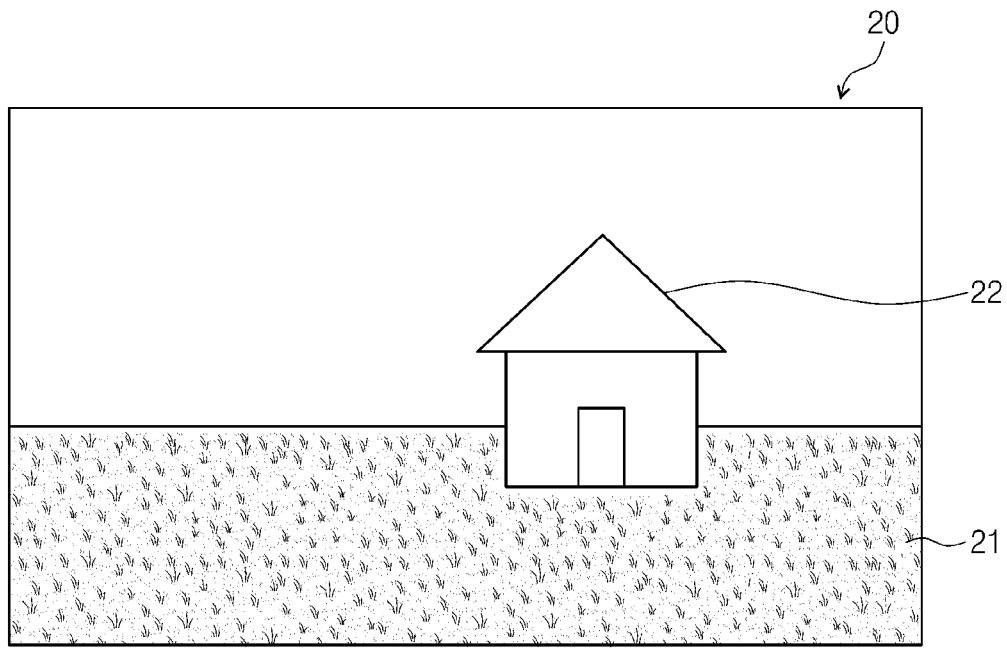
FIG. 2 is a diagram illustrating an example of an image to be interpolated according to an embodiment of the inventive concept.

The edge area distinguishing part 11 may distinguish an edge area including an edge and a non-edge area not including an edge from an image to be interpolated. FIG. 2 is a diagram illustrating an example of an image to be interpolated according to an embodiment of the inventive concept.

Referring to FIG. 2, an image 20 may show a figure where a house 22 is on grassland 21. Grass may densely grow at the grassland 21. The image 20 may express a detailed figure of the grassland 21 where grass grows.

Figure 3:
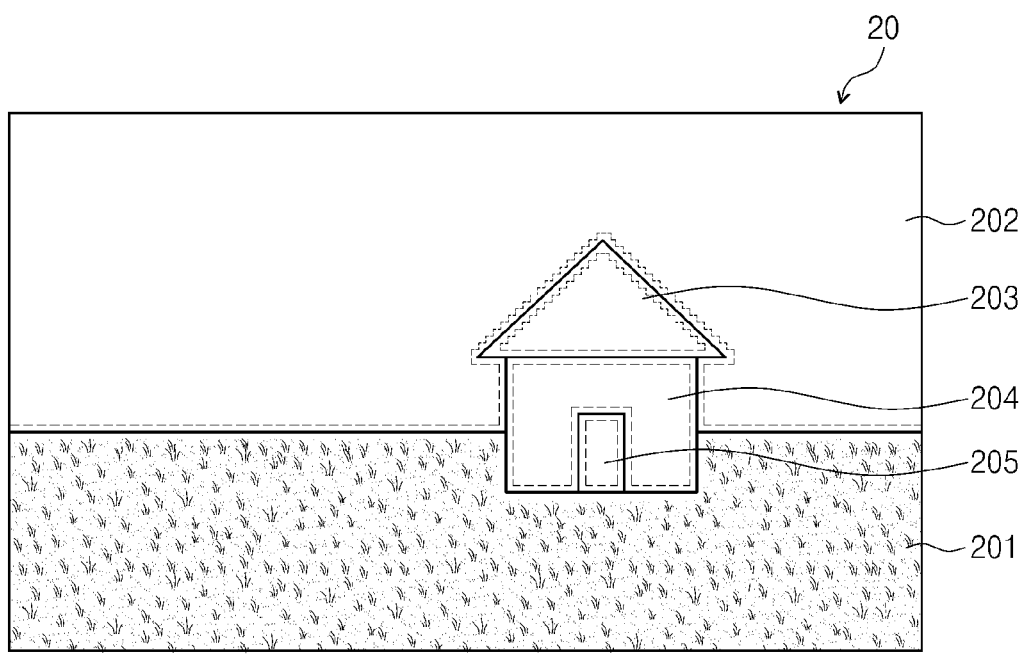
FIG. 3 is a diagram illustrating an example of an image in which an edge area and a non-edge area are distinguishable.

According to an embodiment of the inventive concept, an edge area distinguishing part 11 may distinguish an edge area including an edge from the image 20. For example, as illustrated in FIG. 3, the edge area distinguishing part 11 may distinguish an edge area 201 including an edge from the image 20. The remaining area of the image 20 except the edge area 201 may be non-edge areas 202, 203, 204, and 205 not including an edge. In other words, a sky, a house, a wall, and a door of the image 20 may be expressed only by a color without an edge.

According to an embodiment of the inventive concept, the edge area distinguishing part 11 may distinguish the edge area 201 by calculating variance in pixel values of pixels included in an area of the image 20. In example embodiments, when variance in pixel values of pixels included in an area of the image 20 is larger than a predetermined threshold value, the edge area distinguishing part 11 may decide the area as an edge area. On the other hand, when variance in pixel values of pixels included in an area of the image 20 is equal to or smaller than the predetermined threshold value, the edge area distinguishing part 11 may decide the area as a non-edge area.

An area of an image being a target for calculation of variance to distinguish the edge area 201 may have a size of 4×4. However, the inventive concept is not limited thereto. For example, it is possible to calculate variance on an area having a size larger or smaller than the size of 4×4.

If variance in a pixel value at a predetermined area is larger than a predetermined threshold value, a difference between pixel values of pixels may be viewed to be large. In this case, the area may be classified into the edge area 201 including an edge. On the other hand, if variance in a pixel value at a predetermined area is equal to or smaller than a predetermined threshold value, pixel values of pixels may be viewed to be uniformly distributed over the area. In this case, the area may be classified into a non-edge area not including an edge.

Figure 4:
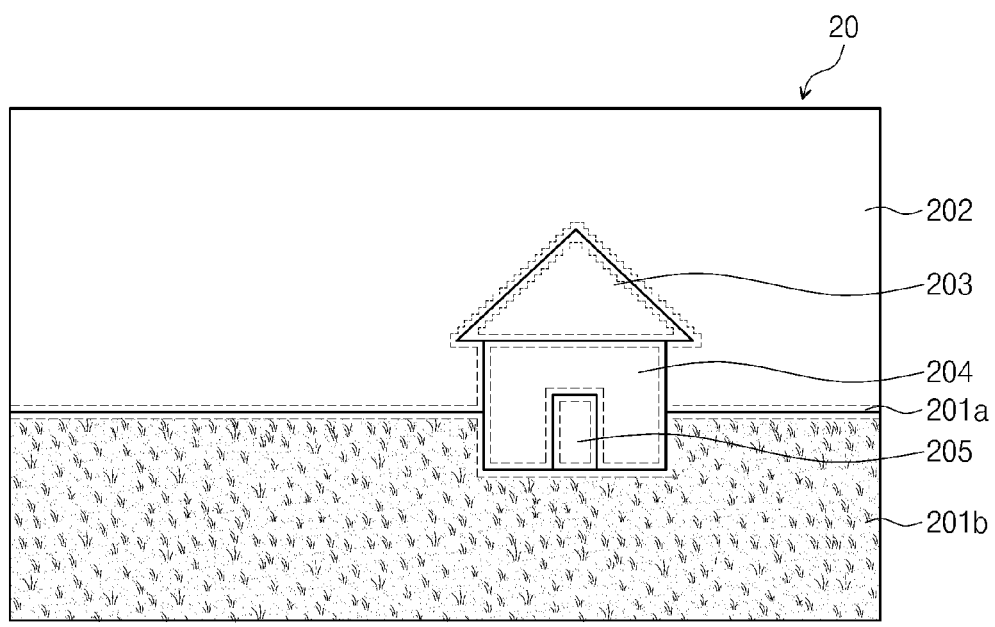
FIG. 4 is a diagram illustrating an example of an image in which an edge area is divided into a plurality of regions.

An edge area classifying part 13 may classify the edge area 201 into a plurality of regions. FIG. 4 is a diagram illustrating an example of an image in which an edge area 201 is divided into two regions 201a and 201b. As illustrated in FIG. 4, an edge region 201 may be divided into a main region 201a including a main edge contributing to a main contour of an image and a sub region 201b including a sub edge contributing to a detail of the image. As illustrated in FIG. 4, an edge area classifying part 13 may classify the edge area 201 into two regions. However, the inventive concept is not limited thereto. For example, the edge area 201 can be classified into three or more regions.

The edge area classifying part 13 may classify an edge area according to the number of edges included in one area of the edge area 201. In example embodiments, if the number of edges included in one area of the edge area 201 is less than or equal to a predetermined threshold value, the edge area classifying part 13 may decide the area as a first region, that is, the main region 201a. On the other hand, if the number of edges included in one area of the edge area 201 is more than the predetermined threshold value, the edge area classifying part 13 may decide the area as a second region, that is, the sub region 201*b*.

In the case that edges included in a region of a predetermined size at the edge area 201 are many, the edge may be a short edge. In this case, the probability that the short edge is a sub edge contributing to a detail of the image 20 may be high. Also, in the case that the number of edges included in a region of a predetermined size at the edge area 201 is small, the edge may be a long edge. In this case, the probability that the long edge is a main edge contributing to a main contour of the image 20 may be high. In example embodiments, thus, the edge area 201 may be divided into a plurality of regions, the number of edges included in each region may be counted, and a corresponding region may be classified into a main region 201*a* when the number of edges is below a threshold value and into a sub region 201*b* when the number of edges is over the threshold value.

Returning to FIG. 1, an image interpolation apparatus 100 according to an embodiment of the inventive concept may further comprise an edge map generating part 12 which detect an edge included in an edge area 201 to generate an edge map. The edge map generating part 12 may allot '1' to a pixel corresponding to an edge of the edge area 201 and '0' to a pixel not corresponding to an edge to generate an edge map indicative of an edge distribution of the edge area 201.

Figure 5:
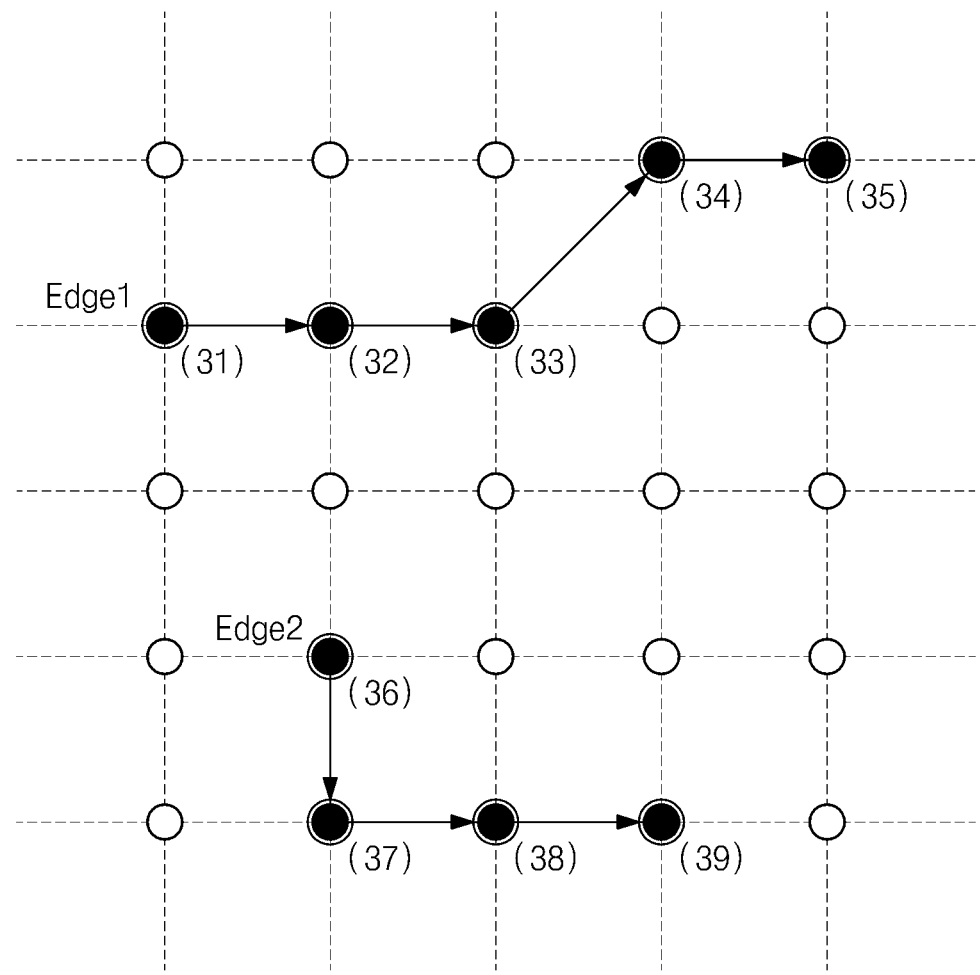
FIG. 5 is a diagram illustrating an edge map generating method according to an embodiment of the inventive concept.

FIG. 5 is a diagram illustrating an edge map generating method according to an embodiment of the inventive concept. According to an embodiment of the inventive concept, an edge map generating part 12 may detect a first pixel corresponding to an edge of an edge area 201, detect a second pixel, corresponding to the edge, from among a plurality of pixels located around the first pixel, and connect the first and second pixels.

For example, as illustrated in FIG. 5, the edge map generating part 12 may detect a first pixel 31 corresponding to an edge of the edge area 201. The edge map generating part 12 may detect a second pixel, corresponding to the edge, from among eight pixels located around the first pixel 31 on the basis of the first pixel 31. Referring to FIG. 5, a pixel 32 located at a right side of the first pixel 31 may correspond to the edge. The edge map generating part 12 may interconnect pixels corresponding to the edge by connecting the first pixel 31 corresponding to a start point and the second pixel 32 located around the first pixel 31.

The edge map generating part 12 may detect another pixel, corresponding to the edge, from among pixels located around the second pixel 32. Referring to FIG. 5, a pixel 33 located at a right side of the second pixel 32 may correspond to the edge. The edge map generating part 12 may connect the second pixel 32 and the third pixel 33 being a next edge pixel.

The edge map generating part 12 may iterate the above-described operation until a new edge pixel is not detected at the periphery of the edge pixel. In the edge area 201 illustrated in FIG. 5, detection on the edge 1 may be ended when a fifth pixel 35 is detected.

Then, the edge map generating part 12 may detect a pixel corresponding to another edge of the edge area 201, detect an edge pixel located around the detected pixel, and connect the detected pixels. This operation may be iterated. For example, in the edge area 201 illustrated in FIG. 5, the edge map generating part 12 may detect a first pixel 36 corresponding to an edge 2 being another edge, and may detect a second pixel 37, corresponding to the edge 2, from among eight pixels located around the first pixel 36. The edge map generating part 12 may interconnect the first and second pixels 36 and 37 as edge pixels. Detection on the edge 2 may be ended when a fourth pixel 39 is detected through iteration of the above description. The edge map generating part 12 may detect and connect pixels corresponding to an edge of the edge area 201 to generate an edge map indicative of information on a distribution, a length, and the number associated with each edge of the edge area 201.

According to an embodiment of the inventive concept, the edge area classifying part 13 may classify the edge area 201 into a plurality of regions using the edge map. In example embodiments, when the number of edges included in an area of the edge map is smaller than or equal to a predetermined threshold value, the edge area classifying part 13 may decide the area as a first region, that is, a main region 201*a*. On the other hand, when the number of edges included in an area of the edge map is more than the predetermined threshold value, the edge area classifying part 13 may decide the area as a second region, that is, a sub region 201*b*.

An area in which the number of edges is counted to classify the edge area 201 may have a size of 15×15. However, the inventive concept is not limited thereto. For example, the number of edges can be counted with respect to a size smaller or more than a size of 15×15.

Figure 6:
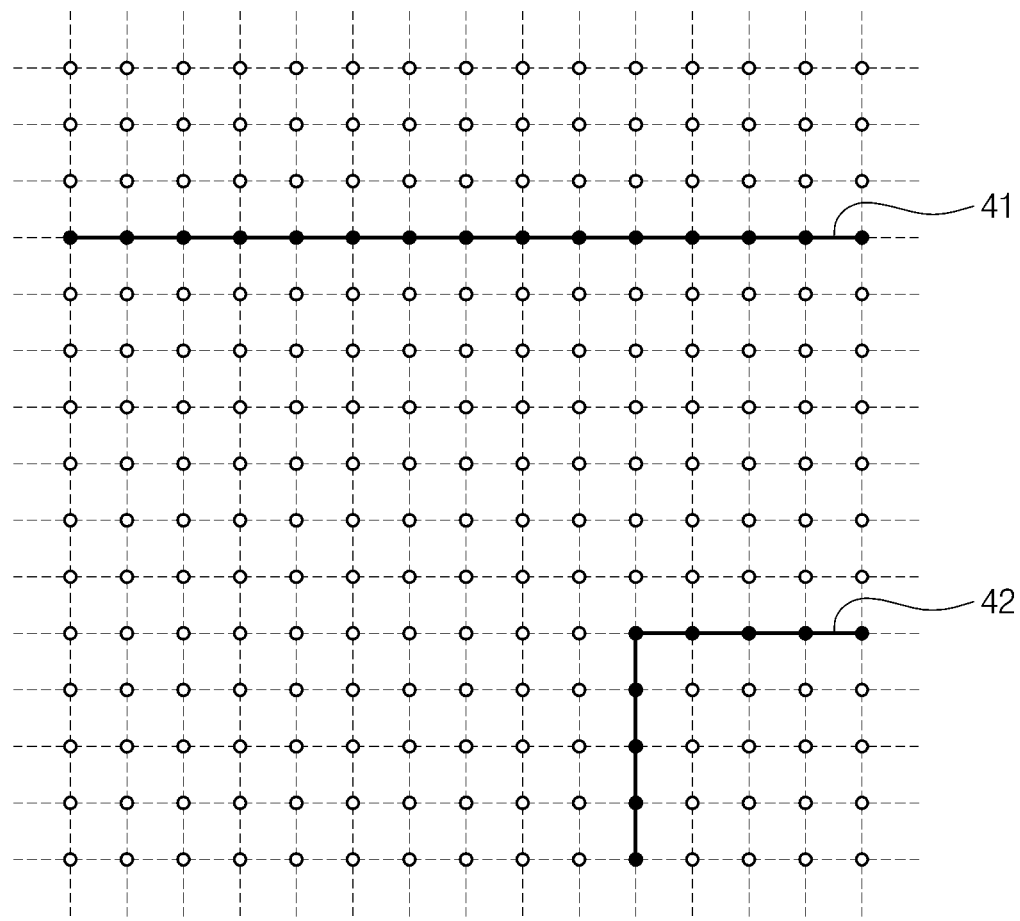
FIGS. 6 and 7 are diagrams illustrating an operation of classifying an edge area into a plurality of regions according to an embodiment of the inventive concept.
Figure 7:
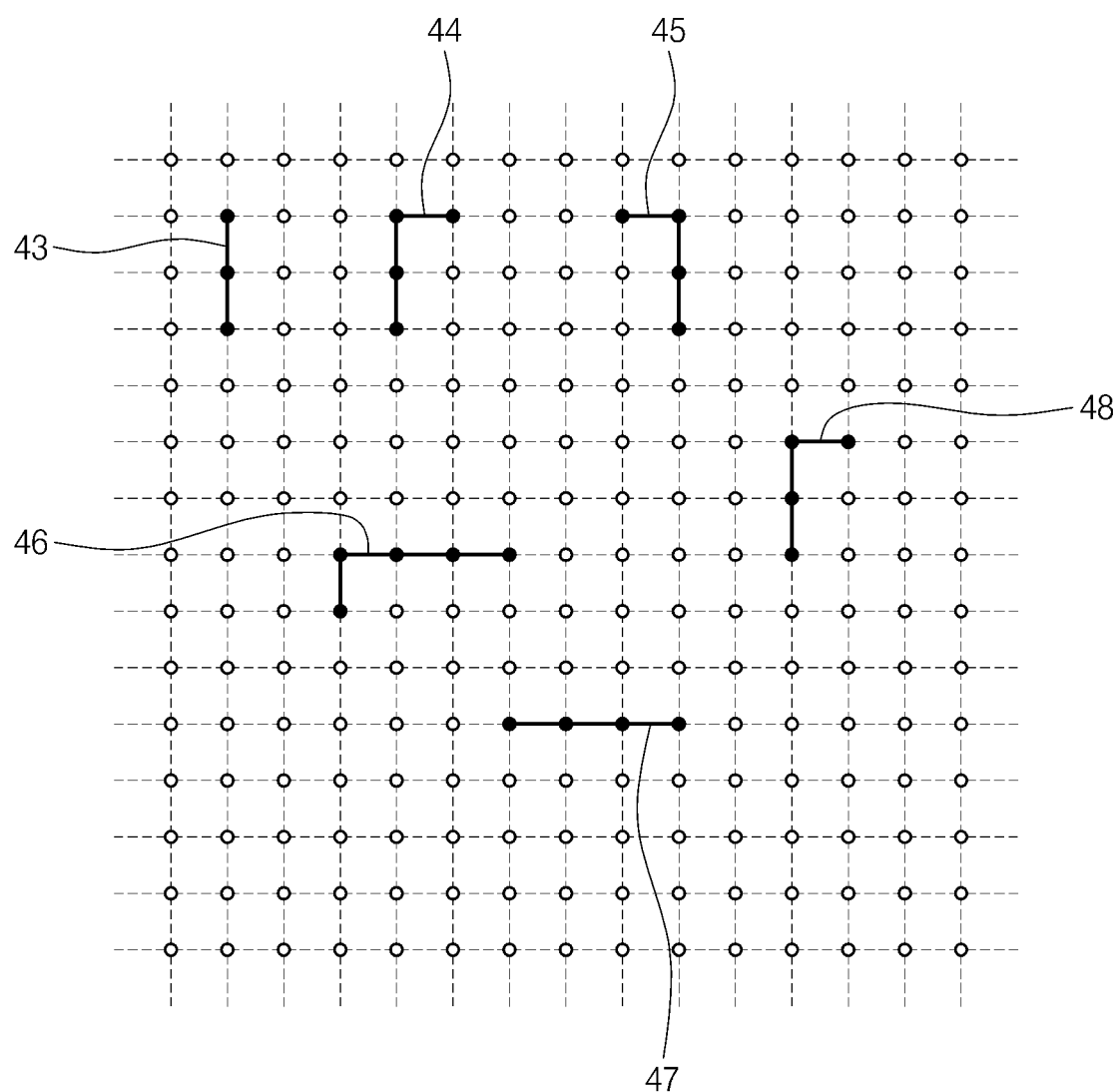

FIGS. 6 and 7 are diagrams illustrating an operation of classifying an edge area into a plurality of regions according to an embodiment of the inventive concept. As illustrated in FIGS. 6 and 7, an edge area classifying part 13 may read a region having a predetermined size (e.g., 15×15) from an edge map, and may count the number of edges included in the region. A region illustrated in FIG. 6 may include two edges 41 and 42, and a region illustrated in FIG. 7 may include six edges 43 to 48.

The edge area classifying part 13 may count the number of edges included in the read region, and may classify the region through comparison between the counted edge number and a threshold value. In example embodiments, the threshold value may be set to one between 1 and 5. However, the inventive concept is not limited thereto. The threshold value can be set to more than 5 according to an image to be interpolated. In FIGS. 6 and 7, it is assumed that a threshold value is set to 2.

Since a region illustrated in FIG. 6 includes two edges 41 and 42 corresponding to a threshold value, the edge area classifying part 13 may decide the region as a first region. Since a region illustrated in FIG. 7 includes six edges 43 and 48 over the threshold value, the edge area classifying part 13 may decide the region as a second region.

In other example embodiments, the edge area classifying part 13 may classify an edge area based on a length of an edge, instead of the number of edges included in a region of an edge map. For example, if a length of the longest edge of edges included in a region of the edge map is longer than a predetermined threshold value, the edge area classifying part 13 may decide the region as a first region 201*a*. Also, if a length of the longest edge of edges included in a region of the edge map is shorter than the predetermined threshold value, the edge area classifying part 13 may decide the region as a second region 201*b*.

In still other example embodiments, the edge area classifying part 13 may classify an edge area based on the whole length of edges included in a region of an edge map. For example, the edge area classifying part 13 may add lengths of edges included in a region of the edge map. If the added length is longer than a predetermined threshold value, the edge area classifying part 13 may decide the region as a first region 201*a*. If the added length is shorter than or equal to the predetermined threshold value, the edge area classifying part 13 may decide the region as a second region 201*b*.

An interpolation part 14 may interpolate regions classified by the edge area classifying part 13 in different manners. In example embodiments, to interpolate a pixel included in the first region 201a of the edge area 201, the interpolation part 14 may use adjacent pixels more than 4, which are located around a corresponding pixel.

Figure 8:
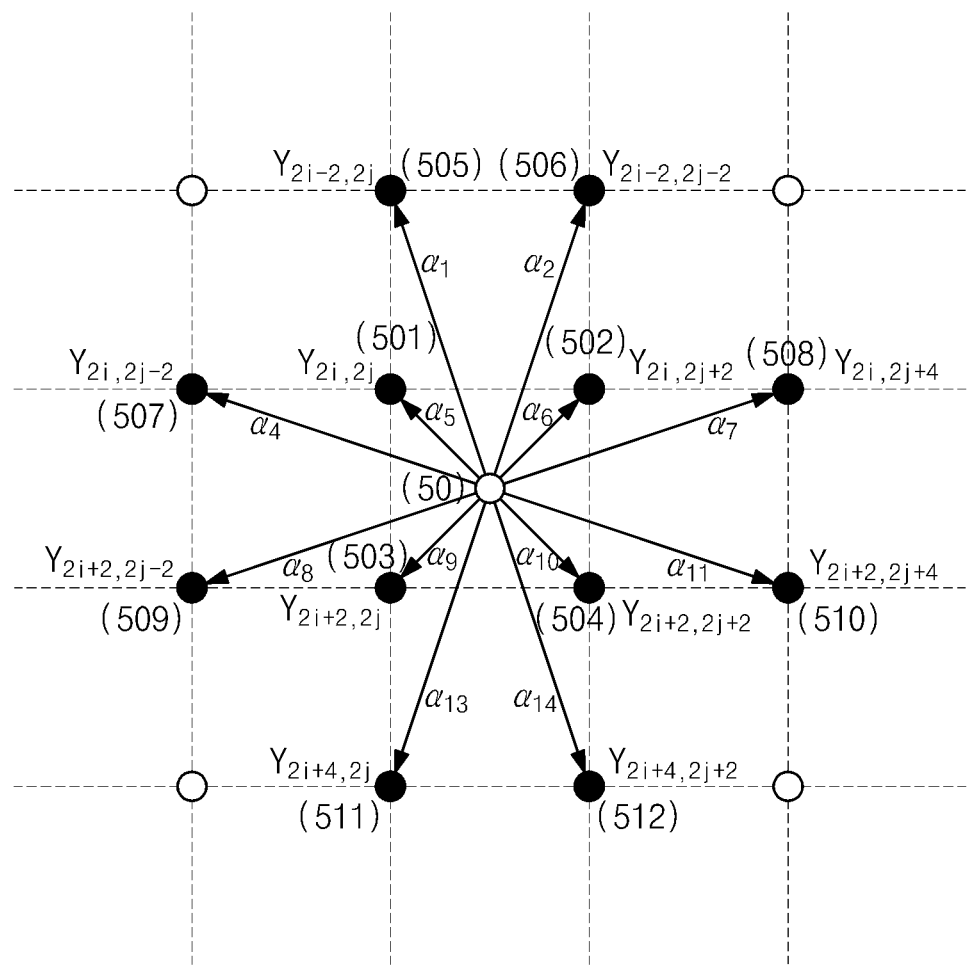
FIG. 8 is a diagram illustrating a method of interpolating a pixel included in a first region according to an embodiment of the inventive concept.
Figure 9:
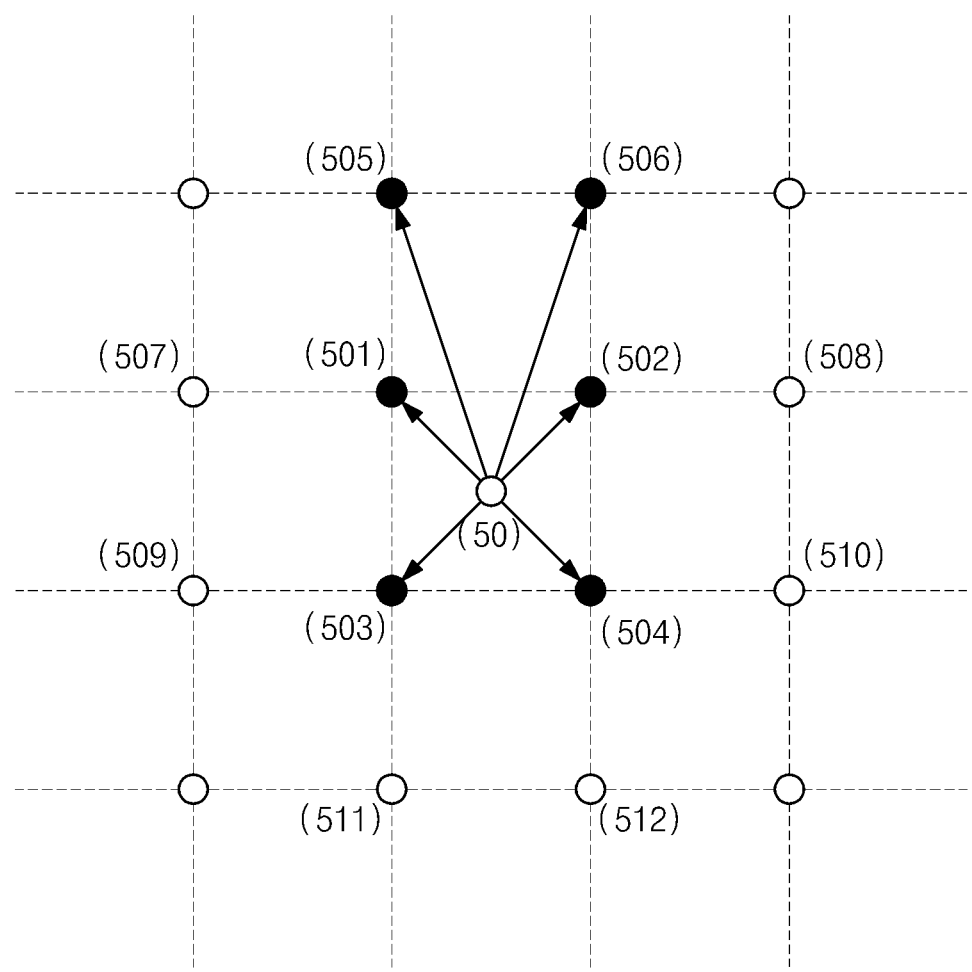
FIGS. 9 to 13 are diagrams for describing a process of interpolating a pixel included in an edge region according to another embodiment of the inventive concept.
Figure 10:
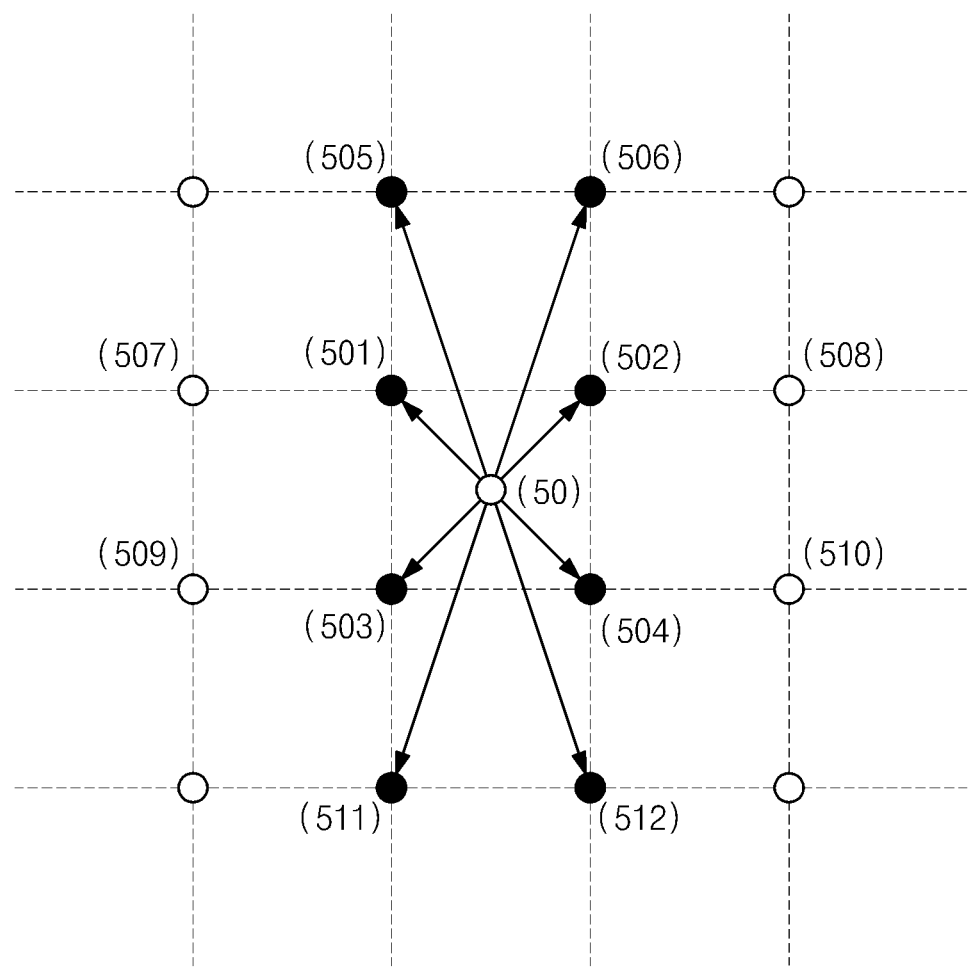
Figure 11:
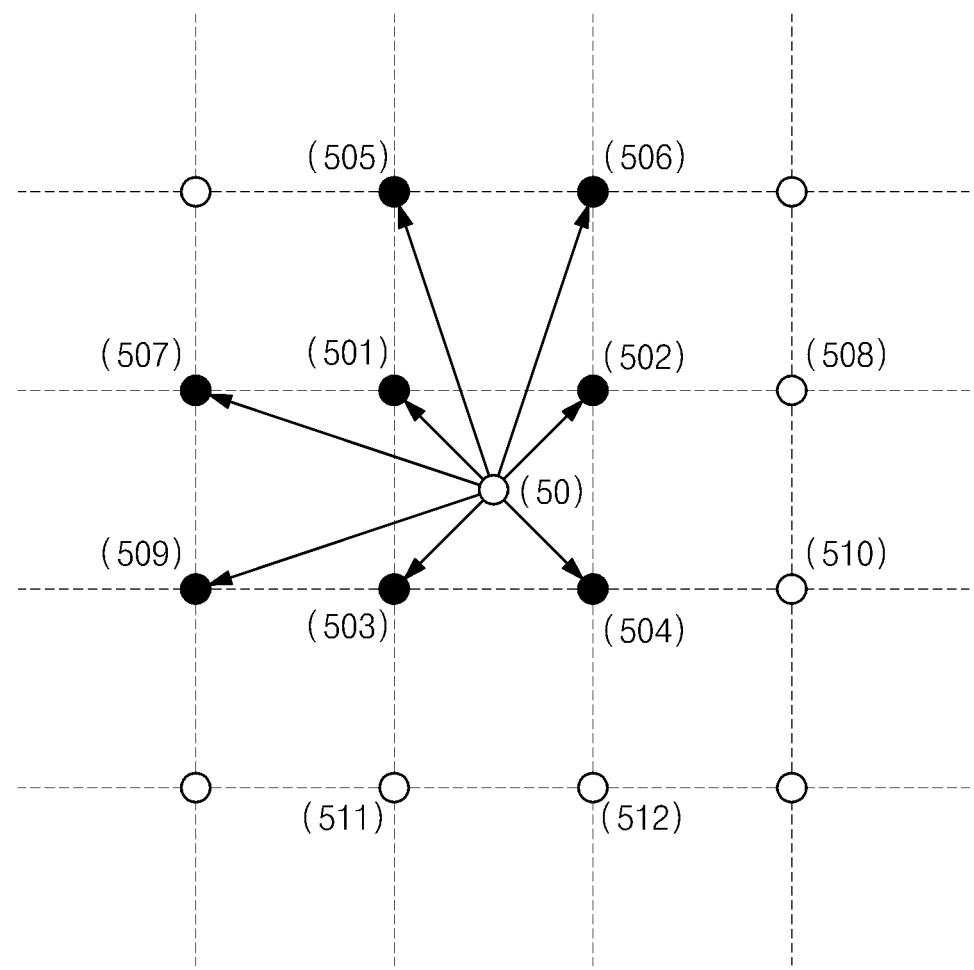
Figure 12:
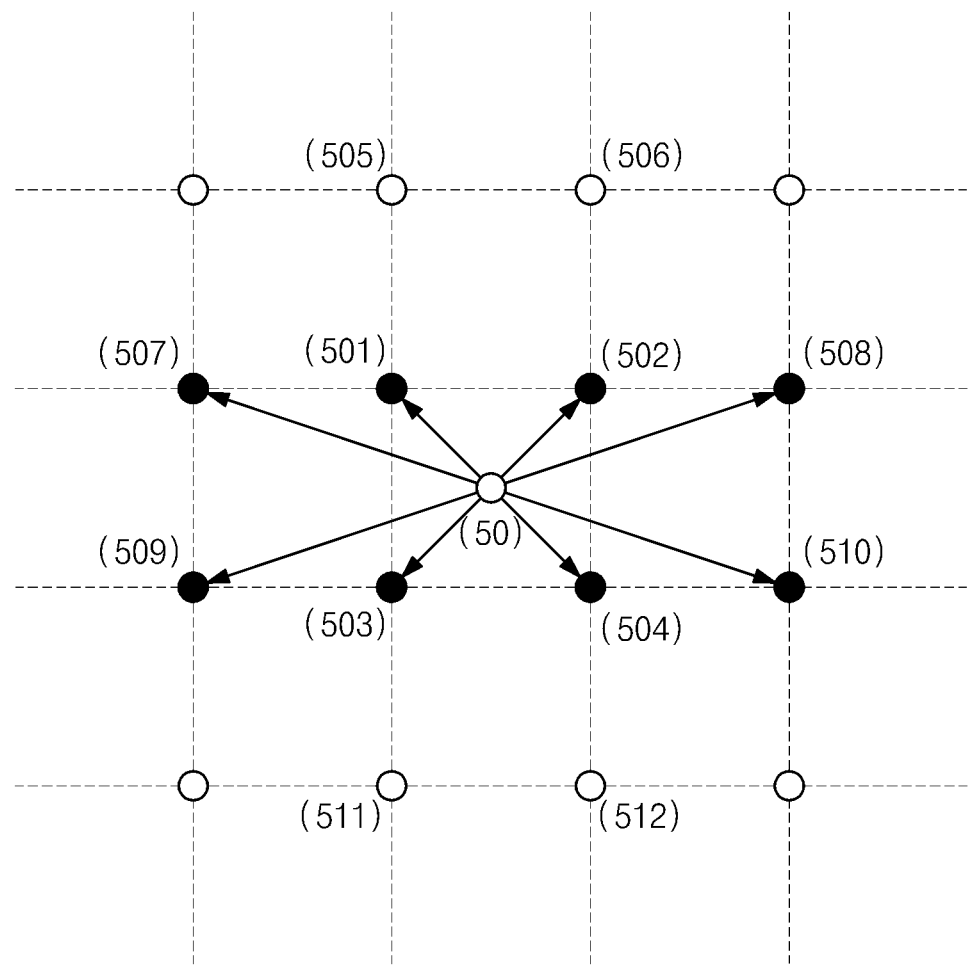

FIG. 8 is a diagram illustrating a method of interpolating a pixel included in a first region according to an embodiment of the inventive concept. As illustrated in FIG. 8, an interpolation part 14 may use 12 neighboring pixels 501 to 512 surrounding a pixel 50 to interpolate the pixel 50 included in a first region 201a. In other words, the interpolation part 14 may refer to pixels values of pixels located in 12 directions on the basis of a corresponding pixel to interpolate the pixel 50 included in the first region 201a.

According to an embodiment of the inventive concept, the interpolation part 14 may calculate a pixel value of the pixel 50 by applying and adding a weight to a pixel value of each of neighboring pixels. For example, the interpolation part 14 may interpolate the pixel 50 using the following equation.

$$\hat{Y}_{2i+1,2j+1} = \sum_{k=0}^{3} \sum_{l=0}^{3} a_{4k+l} Y_{2(i+k-1),2(j+l-1)}$$ [Equation 1]

Herein, 'α' may be a weight applied to a pixel value, and $a_{0,3,12,15}$ may be 0.

According to an embodiment of the inventive concept, the weight α may be calculated using a wiener filter principle. For example, the weight α may be calculated using the following equation.

$$\vec{a} = R^{-1} \vec{r}$$ [Equation 2]

Herein, R may indicate may indicate an auto covariance matrix of pixels included in a region having a predetermined size. $\vec{r}$ may indicate a cross covariance matrix of pixels included in a region having a predetermined size. According to an embodiment of the inventive concept, a size of a region where R and $\vec{r}$ are calculated to calculate the weight α may be equal to a size of a region where the number of edges is counted.

Since information on $Y_{2i+1, 2j+1}$ being a pixel value of the pixel 50 does not exist upon calculating of the weight α, it is impossible to calculate R and $\vec{r}$ from a high-resolution image. However, since geometric duality exists between a low-resolution image before interpolation and a high-resolution image after interpolation, R and $\vec{r}$ needed to calculate the weight α may be calculated from the low-resolution image before interpolation.

In other example embodiments, the weight α may be calculated on the basis of distances between a pixel 50 to be interpolated and neighboring pixels 501 to 512. For example, the weight α may be calculated to be inversely proportional to distances between a pixel 50 to be interpolated and neighboring pixels 501 to 512, or may be calculated to be inversely proportional to a square of the distance.

The interpolation part 14 may use neighboring pixels equal to or less than 4, which are located around a corresponding pixel to interpolate a pixel included in a second region 201b. In other words, the interpolation part 14 may interpolate a pixel using neighboring pixels more than 4 with respect to a first region 201a including a main edge contributing to a main contour of the image 20. The interpolation part 14 may interpolate a pixel using neighboring pixels equal to or less than 4 with respect to a second region 201b including a sub edge contributing to a detail or texture of the image 20. In example embodiments, the interpolation part 14 may perform interpolation using a linear interpolation manner with respect to a pixel of a non-edge area (202 to 205) not including an edge of the image 20.

An image interpolation apparatus 100 according to an embodiment of the inventive concept may reflect information of a pixel over multiple directions with respect to a long edge considerably affecting the quality or resolution of the image 20, not referring to a pixel only in a specific direction. Thus, it is possible to obtain more precise images. In addition, the image interpolation apparatus 100 may reduce a computation quantity required for interpolation by referring to pixels the number of which is less than that of a long edge, with respect to a short edge less affecting the quality or resolution of the image 20.

Figure 13:
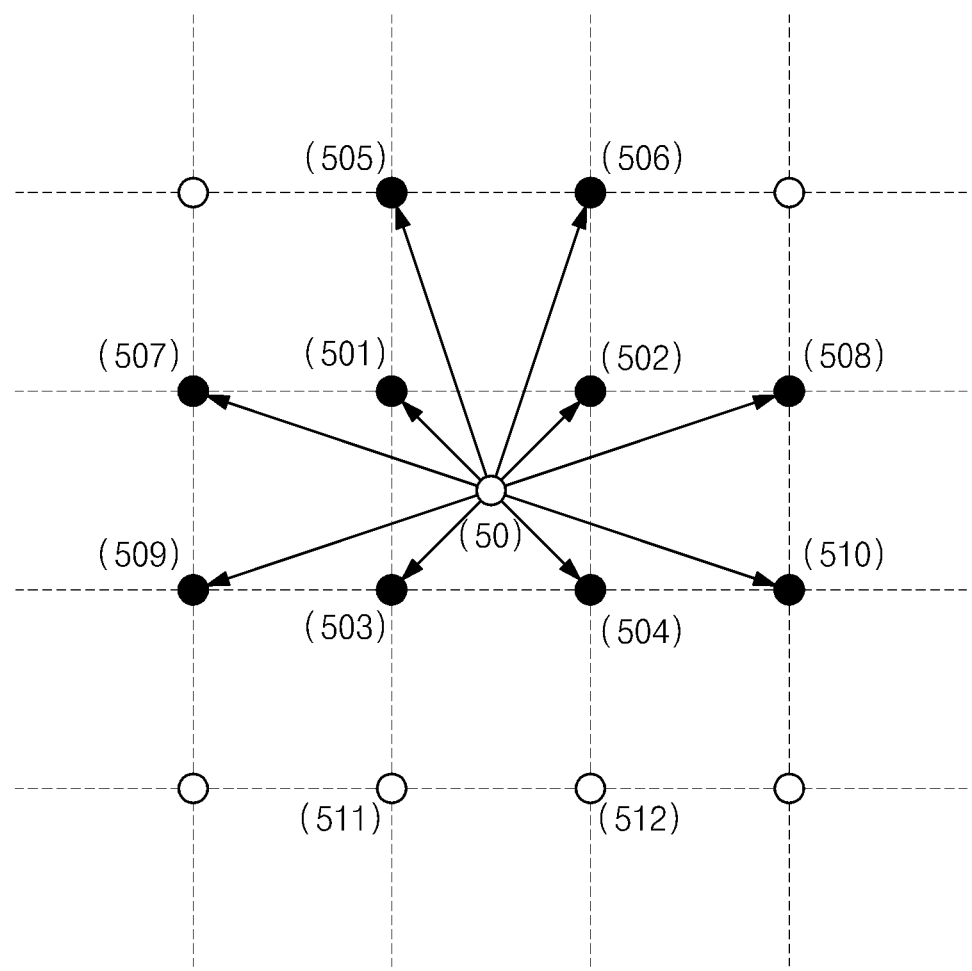

In an embodiment illustrated in FIG. 8, the interpolation part 14 may use 12 neighboring pixels 501 to 512 to interpolate a pixel 50 included in a first region 201a. However, as illustrated in FIGS. 9 to 12, the interpolation part 14 can use six neighboring pixels 501 to 506 around the pixel 50 (refer to FIG. 9), eighth neighboring pixels 501 to 506, 511 and 512 around the pixel 50 (refer to FIG. 10), eighth neighboring pixels 501 to 507 and 509 around the pixel 50 (refer to FIG. 11), eighth neighboring pixels 501 to 504 and 507 and 510 around the pixel 50 (refer to FIG. 12), or ten neighboring pixels 501 to 510 around the pixel 50 (refer to FIG. 13). In addition, the interpolation part 14 may perform interpolation based on 5, 7, 9, or 11 neighboring pixels around the pixel 50, or may perform interpolation based on neighboring pixels more than 12.

Figure 14:
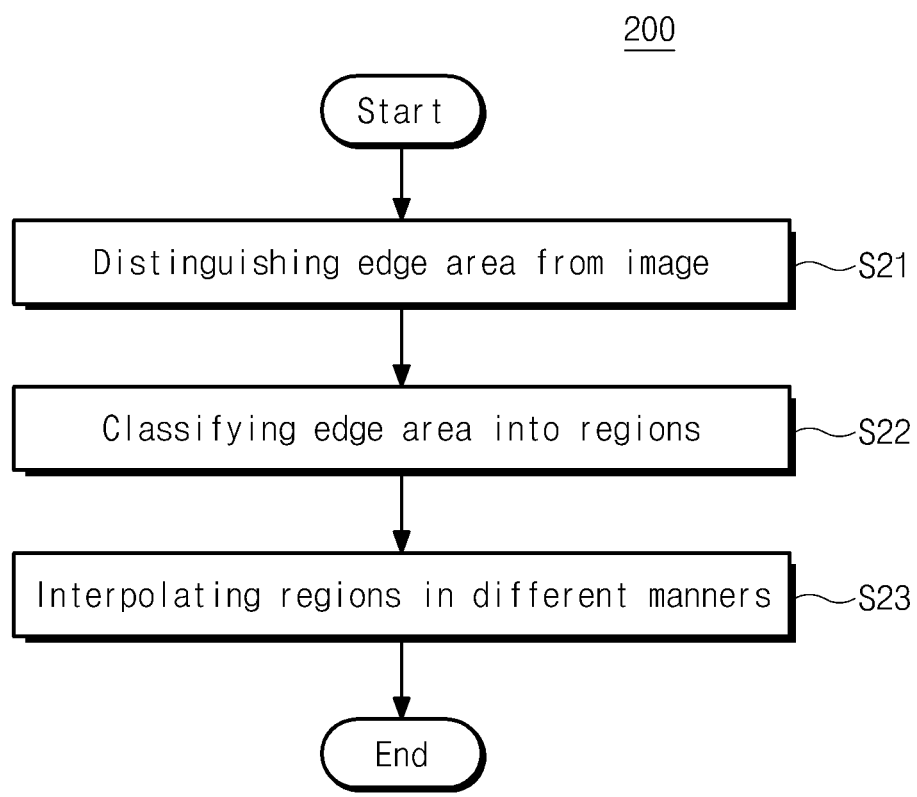
FIG. 14 is a flow chart illustrating an image interpolation method according to an embodiment of the inventive concept.

FIG. 14 is a flow chart illustrating an image interpolation method according to an embodiment of the inventive concept. An image interpolation method according to an embodiment of the inventive concept may perform interpolation in a plurality of manners with respect to an edge area including an edge of an image, using the above-described image interpolation apparatus 100.

As illustrating in FIG. 14, the image interpolation method 200 according to an embodiment of the inventive concept may include operations of distinguishing an edge area from an image (S21); classifying the edge area into a plurality of regions (S22); and interpolating the regions in different manners (S23).

The operation S21 may be performed by an edge area distinguishing part 11 of an image interpolation apparatus 100. The edge area distinguishing part 11 may distinguish an edge area 201 including an edge and non-edge areas 202 to 205 not including an edge from an image to be interpolated.

Figure 15:
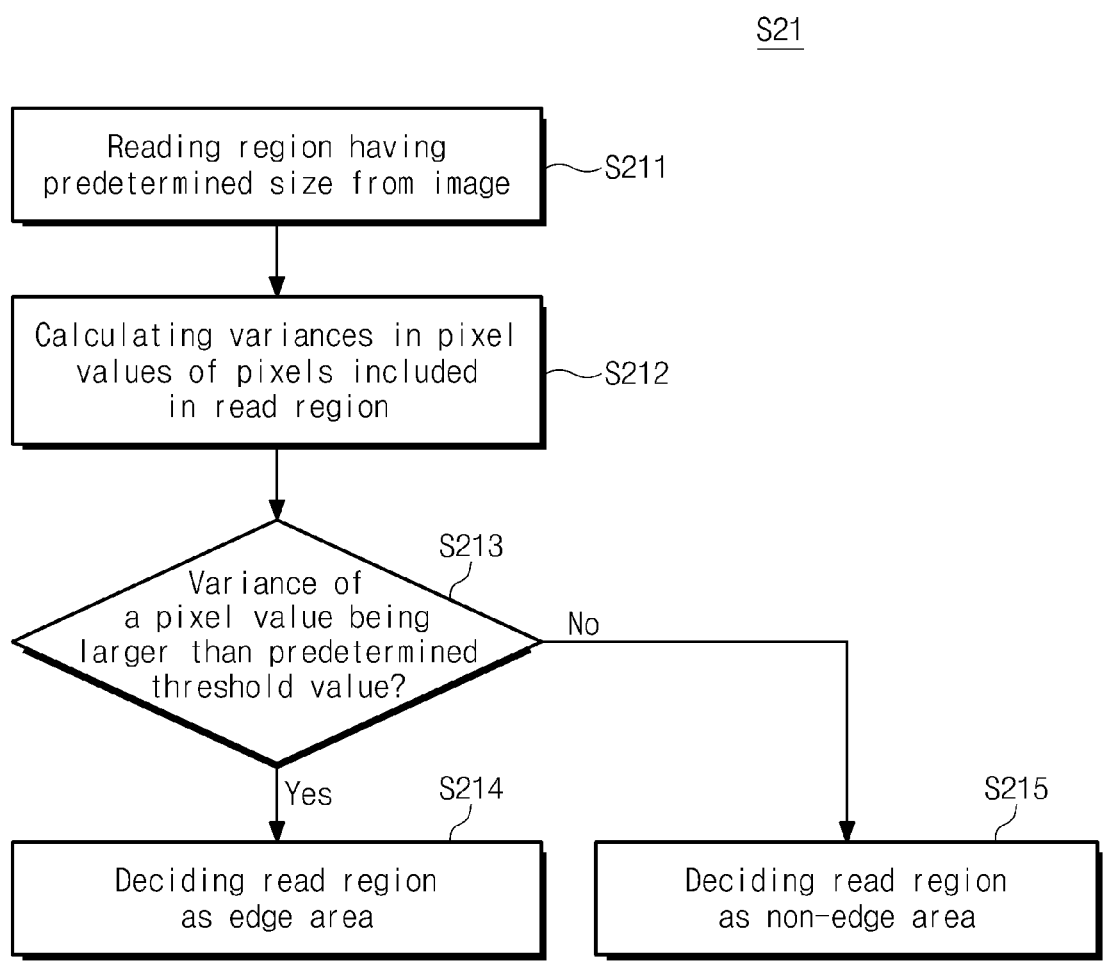
FIG. 15 is a flow chart illustrating an operation of distinguishing an edge area from an image according to an embodiment of the inventive concept.

FIG. 15 is a flow chart illustrating an operation of distinguishing an edge area from an image according to an embodiment of the inventive concept. As illustrated in FIG. 15, an operation S21 of distinguishing an edge area from an image may include operations of reading a region having a predetermined size from an image 20 (S211); calculating variances in pixel values of pixels included in the read region (S212); and deciding the read region as an edge area 201 when variance of a pixel value is larger than a predetermined threshold value (Yes in operation S213) (S214).

In example embodiments, a region read to calculate variance of a pixel value may have a size of 4×4. However, the inventive concept is not limited thereto. For example, a size of a region read to calculate variance of a pixel value can be larger or smaller than the size of 4×4.

In example embodiments, the operation S21 of distinguishing an edge area from an image may include an operation of deciding the read region as a non-edge area (one of 202 to 205) when variance of a pixel value is equal to or smaller than the predetermined threshold value (No in operation S213) (S215).

An operation S22 may be performed by an edge area classifying part 13 of the image interpolation apparatus 100. The edge area classifying part 13 may classify the edge area 201 distinguished from the image 20 into a plurality of regions.

Figure 16:
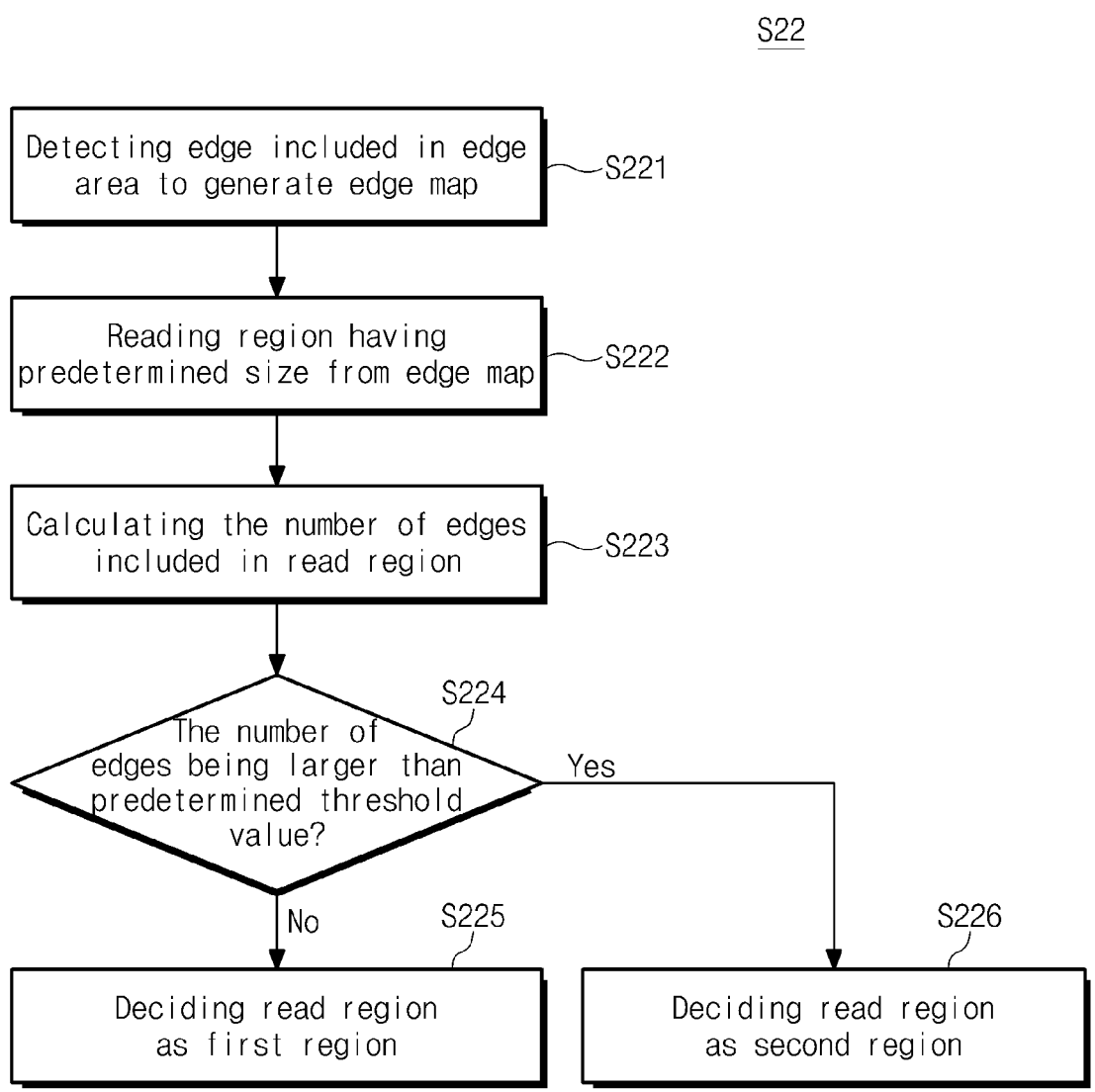
FIG. 16 is a flow chart illustrating an operation of classifying an edge area into a plurality of regions according to an embodiment of the inventive concept.

FIG. 16 is a flow chart illustrating an operation of classifying an edge area into a plurality of regions according to an embodiment of the inventive concept. As illustrated in FIG. 16, an operation S22 of classifying an edge area into a plurality of regions may include operations of detecting an edge included in an edge area 201 to generate an edge map (S221); reading a region having a predetermined size from an edge map (S222); calculating the number of edges included in the read region (S223); deciding the read region as a first region when the number of edges is smaller than or equal to a predetermined threshold value (Yes in operation S224) (S225); and deciding the read region as a second region when the number of edges is more than the predetermined threshold value (No in operation S224) (S226).

The edge map may be generated by an edge map generating part 12 of an image interpolation apparatus 100. The edge map may be generated by detecting a first pixel corresponding to an edge of the edge area, detecting a second edge, corresponding to the edge, from among a plurality of pixels around the first pixel, and connecting the first pixel and the second pixel.

Detecting of a pixel corresponding to the edge may be performed until a new edge pixel is not detected around an edge pixel. As described above, if an edge is detected from the edge area 201, the detected edge may be indexed by a number, a symbol, or a character. Then, an edge map generating part 12 may detect another edge by detecting a pixel corresponding to another edge of the edge area 201, detecting a pixel, corresponding to the edge, from among pixels around the detected pixel, and connecting the detected pixels.

In example embodiments, a region read from an edge map to calculate the number of edges may have a size of 15×15. However, the inventive concept is not limited thereto. For example, a size of a region read from an edge map to calculate the number of edges may be smaller or larger than the size of 15×15.

If the number of edges of the read region is less than or equal to a predetermined threshold value, the edge area classifying part 13 may decide the region as a first region, that is, a main region 201*a*. If the number of edges of the read region is more than the predetermined threshold value, the edge area classifying part 13 may decide the region as a second region, that is, a sub region 201*b*.

If the number of edges included in the read region is below the predetermined threshold value, an edge included in the region may be viewed to have a relatively long length. A region including a long edge may be classified into a main region contributing to a main contour of an image. On the other hand, if the number of edges included in the read region exceeds the predetermined threshold value, an edge included in the region may be viewed to have a relatively short length. A region including a short edge may be classified into a sub region contributing to a detail of an image or the texture of an object.

In example embodiments, the threshold value may be set to one between 1 and 5. However, the inventive concept is not limited thereto. The threshold value can be set to more than 5 according to an image to be interpolated.

An operation S23 of interpolating the regions in different manners may be performed by an interpolation part 14 of an image interpolation apparatus 100. The operation S23 of interpolating the regions in different manners may include an operation of using neighboring pixels more than 4, which are located around a corresponding pixel to interpolate a pixel included in a first region 201*a*. Also, the operation S23 of interpolating the regions in different manners may include an operation of using neighboring pixels equal to or less than 4, which are located around a corresponding pixel to interpolate a pixel included in a second region 201*b*.

In other words, the number of pixels used to interpolate the main region 201*a* contributing to a main contour of an image 20 may be more than the number of neighboring pixels used to interpolate the sub region 201*b* contributing to a detail or texture of the image 20.

In example embodiments, the operation S23 of interpolating may include an operation of using 12 neighboring pixels 501 to 512 to interpolate a pixel included in a first region 201*a*.

In example embodiments, the operation S23 of interpolating may include an operation of interpolating pixels of non-edge regions 202 to 205 not including an edge of an image 20.

Figure 17:
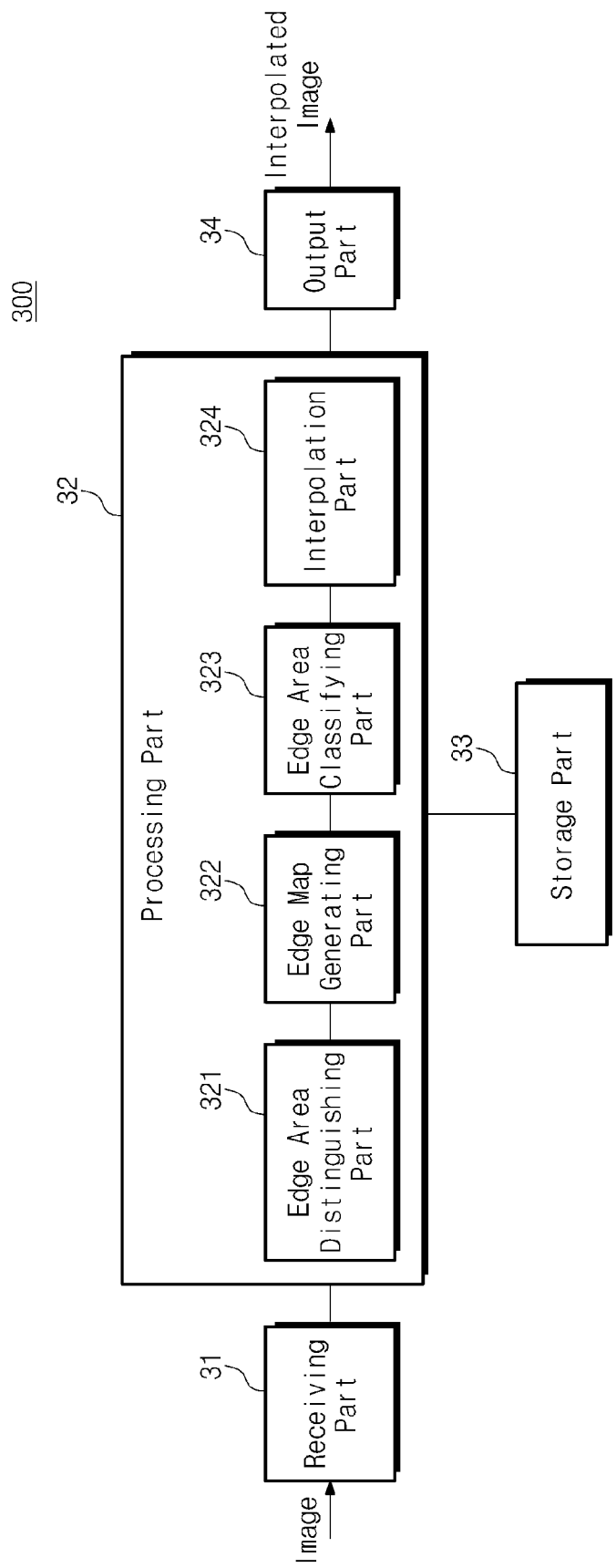
FIG. 17 is a block diagram schematically illustrating an image processing apparatus according to an embodiment of the inventive concept.

FIG. 17 is a block diagram schematically illustrating an image processing apparatus according to an embodiment of the inventive concept. As illustrated in FIG. 17, an image processing apparatus 300 according to an embodiment of the inventive concept may include a receiving part 31, a processing part 32, a storage part 33, and an output part 34.

The receiving part 31 may receive an image. The image may be an original image to be interpolated, and the image processing apparatus 300 may enlarge a size of the original image or convert a low-resolution image into a high-resolution image by interpolating a new pixel using a pixel included in the original image.

The processing part 32 may process the received image. According to an embodiment of the inventive concept, the processing part 32 may include an edge area distinguishing part 321 to distinguish an edge area including an edge from the received image; an edge map generating part 322 to generate an edge map by detecting an edge included in the edge area; an edge area classifying part 323 to classify the edge area into a plurality of regions using the edge map; and an interpolation part 324 to interpolate the regions in different manners.

The edge area distinguishing part 321, the edge map generating part 322, the edge area classifying part 323, and the interpolation part 324 in the processing part 32 may correspond to an edge area distinguishing part 11, an edge map generating part 12, an edge area classifying part 13, and an interpolation part 144 included in the above-described image interpolation apparatus 100. The processing part 32 may be formed of processors (e.g., including CPU, GPU, etc.) performing computation for image processing.

The storage part 33 may store images or data used for image processing. The storage part 33 may be a storage device capable of storing data, and may include RAM, ROM, hard disk drive (HDD), solid state drive (SSD), and so on.

The output part 34 may output the processed image. The output part 34 may transfer the processed image to a display device (e.g., LCD, PDP, etc.) such that an image is displayed on a screen of the display device.

According to an embodiment of the inventive concept, when the number of edges included in a region of an edge area 201 is equal to or less than a predetermined threshold value, the edge area classifying part 323 may decide the region as a first region 201*a*. Also, when the number of edges included in the region of an edge area 201 is more than the predetermined threshold value, the edge area classifying part 323 may decide the region as a second region 201b. In example embodiments, the threshold value can be formed of two or more threshold values. In this case, the edge area classifying part 323 may classify the edge area 201 into three or more regions.

In the above-described embodiment, the edge area classifying part 323 may classify an edge area according to the number of edges included in a region. In other example embodiments, the edge area classifying part 323 may classify an edge area according to a length of the longest edge included in a region. For example, when a length of the longest edge included in a region is longer than a predetermined threshold value, the edge area classifying part 323 may decide the region as a first region 201a. Also, when a length of the longest edge included in a region is equal to or shorter than the predetermined threshold value, the edge area classifying part 323 may decide the region as a second region 201b.

In still other example embodiments, the edge area classifying part 323 may classify an edge area according to the whole length of edges included in a region. For example, the edge area classifying part 323 may add lengths of edges included in a region. If the added edge length is longer than a predetermined threshold value, the edge area classifying part 323 may classify the region into a first region 201a. If the added edge length is equal to or shorter than a predetermined threshold value, the edge area classifying part 323 may classify the region into a second region 201b.

According to an embodiment of the inventive concept, the interpolation part 324 may perform interpolation with respect to a pixel included in the first region 201a, using neighboring pixels more than 4, which are located around a corresponding pixel. Also, the interpolation part 324 may perform interpolation with respect to a pixel included in the second region 201b, using neighboring pixels equal to or less than 4, which are located around a corresponding pixel. Also, the interpolation part 324 may perform interpolation with respect to pixels of non-edge areas 202 to 205 not including an edge of an image 20, using a linear interpolation manner. In other words, the interpolation part 324 may interpolate a pixel of the first region 201a using neighboring pixels more than neighboring pixels used to interpolate a pixel of the second region 201b.

In example embodiments, the interpolation part 324 may use 12 neighboring pixels for interpolation of the first region 201a. However, the inventive concept is not limited thereto. For example, 5 to 11 neighboring pixels may be used, or neighboring pixels more than 12 may be used.

In example embodiments, the interpolation part 324 can use a nonlinear interpolation manner to interpolate the second region 201b.

An image interpolation method 200 according to an embodiment of the inventive concept may be formed of a program executable at a computer, and the program may be stored at a computer-readable storage medium. The computer-readable storage medium may include all types of storage devices in which data capable of being read by a computer system is stored. For example, the computer-readable storage medium may be ROM, RAM, CD-ROM, magnetic tape, floppy disk, optical data storage device, and so on.

In the above-described image interpolation apparatus, image interpolation method, and image processing apparatus, upon interpolation of an image, an edge area including an edge may be classified into a plurality of regions, and different interpolation manners may be applied to the regions. According to the above-described image interpolation apparatus, image interpolation method, and image processing apparatus, it is possible to increase the number of neighboring pixels used for pixel interpolation with respect to a main region contributing to a main contour of an image including an edge having a relatively long length. Also, it is possible to decrease the number of neighboring pixels used for pixel interpolation with respect to a sub region not largely affecting the main contour of an image including an edge having a relatively short length.

According to the above-described image interpolation apparatus, image interpolation method, and image processing apparatus, a long edge of an image may be restored relatively exactly and clearly. Thus, it is possible to obtain an image of which the quality is not largely lowered after interpolation in comparison with an original image. Also, the computation quantity needed for interpolation may be prevented from being sharply increased by differently setting the number of neighboring pixels used to interpolate a pixel according to regions.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An image interpolation apparatus, comprising:
an edge area distinguishing part configured to distinguish an edge area including an edge from an image;
an edge map generating part configured to generate an edge map by detecting an edge included in the edge area;
an edge area classifying part configured to classify the edge area into a plurality of regions according to the number of edges included in the region of the edge map; and
an interpolation part configured to interpolate each of the plurality of regions in different manners.

2. The image interpolation apparatus of claim 1, wherein the edge area distinguishing part distinguishes the edge area by calculating variance of pixel values of pixels included in a region of the image.

3. The image interpolation apparatus of claim 2, wherein the edge area distinguishing part decides the region as an edge area when the variance of the pixel values is larger than a predetermined threshold value and as a non-edge area when the variance of the pixel values is equal to or smaller than the predetermined threshold value.

4. The image interpolation apparatus of claim 1, wherein the edge map generating part detects a first pixel corresponding to an edge at the edge area, detects a second pixel, corresponding to an edge, among a plurality of pixels located around the first pixel, and connects the first and second pixels.

5. The image interpolation apparatus of claim 1, wherein the edge area classifying part decides the region as a first region when the number of edges included in the region is equal to or less than a predetermined threshold value and as a second region when the number of edges included in the region is more than the predetermined threshold value.

6. The image interpolation apparatus of claim 5, wherein the interpolation part interpolates a pixel included in the first region by using neighboring pixels more than 4, which are located around the pixel.

7. The image interpolation apparatus of claim 6, wherein the interpolation part interpolates a pixel included in the first pixel using 12 neighboring pixels surrounding the pixel.

8. The image interpolation apparatus of claim 6, wherein the interpolation part calculates a pixel value of the pixel by applying weights to the pixel values of the neighboring pixels and adding the weighted pixel values.

9. The image interpolation apparatus of claim 8, wherein the weights are calculated using Wiener filter.

10. The image interpolation apparatus of claim 8, wherein the weights are calculated based on distance between the pixel and the neighboring pixels.

11. The image interpolation apparatus of claim 5, wherein the interpolation part interpolates a pixel included in the second region by using neighboring pixels equal to or less than 4, which are located around the pixel.

12. The image interpolation apparatus of claim 1, wherein the interpolation part interpolates a pixel of a non-edge area not including an edge at the image by using linear interpolation manner.

13. An image interpolation method performing interpolation with respect to an edge area including an edge at an image in a plurality of manners by using an image interpolation apparatus, comprising;
   distinguishing an edge area from the image;
   classifying the edge area into a plurality of regions; and
   interpolating each of the plurality of regions in different manners,
   wherein the classifying the edge area into a plurality of regions includes
      generating an edge map by detecting an edge included in the edge area,
      reading a region having a predetermined size from the edge map,
      calculating the number of edges included in the read region,
      deciding the read region as a first region when the number of edges is equal to or less than a predetermined threshold value, and
      deciding the read region as a second region when the number of edges is more than the predetermined threshold value.

14. The image interpolation method of claim 13, wherein the distinguishing an edge area from the image comprises:
   reading a region having a predetermined size from the image;
   calculating variance of pixel values of pixels included in the read region; and
   deciding the read region as an edge area when the variance of the pixel values is larger than a predetermined threshold value.

15. The image interpolation method of claim 13, wherein the interpolating each of the plurality of regions in different manners comprises interpolating a pixel included in the first region using neighboring pixels more than 4, which are located around the pixel.

16. The image interpolation method of claim 13, wherein the interpolating each of the plurality of regions in different manners comprises interpolating a pixel included in the second region using neighboring pixels equal to or less than 4, which are located around the pixel.

17. The image interpolation method of claim 13, wherein the interpolating each of the plurality of regions in different manners comprises interpolating a pixel of a non-edge area not including an edge at the image in linear interpolation manner.

18. A non-transitory computer-readable storage medium storing a program implemented to perform an image interpolation method according to claim 13.

19. An image processing apparatus, comprising:
   a receiving part configured to receive an image; a processing part configured to process the received image;
   a storage part configured to store an image or data to be used to process the image; and
   an output part configured to output the processed image,
   wherein the processing part comprises:
      an edge area distinguishing part configured to distinguish an edge area including an edge from the received image;
      an edge map generating part configured to generate an edge map by detecting an edge included in the edge area;
      an edge area classifying part configured to classify the edge area into a plurality of regions using the edge map according to a number of edges included in the region of the edge map; and
      an interpolation part configured to interpolate each of the plurality of regions in different manners.

20. The image processing apparatus of claim 19, wherein the edge area classifying part decides a region of the edge area as a first region when the number of edges included in the region is equal to or less than a predetermined threshold value and as a second region when the number of edges included in the region is more than the predetermined threshold value.

21. The image processing apparatus of claim 20,
   wherein the interpolation part interpolates a pixel included in the first region using neighboring pixels more than 4, which are located around the pixel,
   interpolates a pixel included in the second region using neighboring pixels equal to or less than 4, which are located around the pixel, and
   interpolates a pixel of a non-edge area not including an edge at the image using linear interpolation manner.

* * * * *